(12) United States Patent
Knight (10) Patent No.: US 8,573,160 B1
(45) Date of Patent: Nov. 5, 2013

(54) SANITARY PET WALKING SYSTEM

(71) Applicant: Randi L. Knight, Springfield, VA (US)

(72) Inventor: Randi L. Knight, Springfield, VA (US)

(*) Notice: Subject to any disclaimer, the term of this patent is extended or adjusted under 35 U.S.C. 154(b) by 0 days.

(21) Appl. No.: 13/923,129

(22) Filed: Jun. 20, 2013

(51) Int. Cl.
*A01K 1/01* (2006.01)
*A01K 27/00* (2006.01)

(52) U.S. Cl.
USPC .................. 119/796; 119/867; 294/1.3

(58) Field of Classification Search
USPC ............. 119/796, 867, 795; 294/1.3, 1.4, 1.5
See application file for complete search history.

(56) References Cited

U.S. PATENT DOCUMENTS

| | | | |
|---|---|---|---|
| 5,540,469 A * | 7/1996 | Albert | 294/1.4 |
| 6,035,809 A | 3/2000 | Fingerett et al. | |
| 6,129,096 A * | 10/2000 | Johnson | 134/34 |
| 6,257,473 B1 * | 7/2001 | Ringelstetter | 224/675 |
| 7,410,197 B2 | 8/2008 | Edwards | |
| 7,506,615 B1 | 3/2009 | Sansone et al. | |
| D634,491 S | 3/2011 | Sigmund | |
| 8,100,445 B1 * | 1/2012 | Brar | 294/1.3 |
| 8,256,379 B2 * | 9/2012 | Rabello | 119/61.56 |
| 8,256,384 B2 * | 9/2012 | Wheeler et al. | 119/795 |
| 8,418,659 B2 * | 4/2013 | Harruna | 119/796 |
| 2004/0231029 A1 * | 11/2004 | Kouri | 2/164 |
| 2006/0162675 A1 * | 7/2006 | Ghalebi et al. | 119/796 |
| 2006/0219188 A1 * | 10/2006 | Beaupre | 119/795 |
| 2008/0265592 A1 | 10/2008 | Askinasi | |
| 2009/0095225 A1 * | 4/2009 | O'Connell | 119/161 |
| 2011/0197820 A1 * | 8/2011 | Goldy et al. | 119/61.5 |

\* cited by examiner

*Primary Examiner* — Yvonne Abbott (57) ABSTRACT

A sanitary pet walking system for providing a lit walking path while safely restraining the pet and further providing a sanitary system for managing pet feces features a hollow base having a light located on a base first end terminating end. The system features a handle with a power switch on a base top and a retractable leash located on a base bottom. A disposable glove designed to pick up pet feces is constructed from a water resistant material. The glove features a first plastic zipper component located on a glove face close to a glove terminating end and a mating second plastic zipper component located opposed to the first plastic zipper component on a glove back close to the glove terminating end.

6 Claims, 6 Drawing Sheets

SANITARY PET WALKING SYSTEM

FIELD OF THE INVENTION

The present invention relates to pet walking systems, or more specifically, pet walking systems that feature path illumination and feces cleanup.

BACKGROUND OF THE INVENTION

Taking a pet for a walk is an event that is enjoyed by countless individuals all across the world. Two common issues that arise when walking a pet are safety during the walk and sanitation when the pet defecates. The present invention features a sanitary pet walking system for providing a lit walking path while safely restraining the pet and further providing a sanitary means for managing pet feces.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a sanitary pet walking system for providing a lit walking path while safely restraining a pet and further providing a sanitary means for managing pet feces. In some embodiments, the system comprises a hollow base. In some embodiments, a base first end flares to a base middle. In some embodiments, the base middle flares to a base second end. In some embodiments, a base bottom perpendicularly flares to the base middle.

In some embodiments, the system comprises a light located on a base first end terminating end. In some embodiments, the system comprises a base middle chamber located in the base middle. In some embodiments, a power supply is located in the base middle chamber.

In some embodiments, the system comprises a handle with a power switch. In some embodiments, the system comprises a retractable leash located on a base bottom. In some embodiments, the system comprises a disposable glove designed to pick up pet feces. In some embodiments, the glove is constructed from a water resistant or water proof material. In some embodiments, the glove comprises a first plastic zipper component located on a glove face close to a glove terminating end and a mating second plastic zipper component located opposed to the first plastic zipper component on a glove back close to the glove terminating end.

DESCRIPTION OF PREFERRED EMBODIMENTS

Following is a list of elements corresponding to a particular element referred to herein:
100 Pet walking system
110 Base
112 Base first end
113 Base first end terminating end
114 Base second end
115 Base second end terminating end
116 Base middle
117 Base middle chamber
118 Base top
119 Base bottom
120 Light
130 Feces storage chamber
131 Lid
132 Internal threads
133 External threads
140 Power supply
141 Power switch
150 Handle
152 Handle first end
154 Handle second end
160 Leash
162 Leash first end
163 Clip
164 Leash second end
166 Spring
168 Leash cavity
170 Glove
172 Glove terminating end
174 Glove face
175 First plastic zipper component
176 Glove back
177 Second plastic zipper component
180 Spring
181 Spring first end
182 Spring second end
200 Bag chamber
202 Bag chamber lid
204 Bag chamber pop up lid
210 First cylinder
212 First cylinder terminating end
220 First click lock attachment
250 Wipe chamber
252 Wipe chamber lid
254 Wipe chamber pop up lid
260 Second cylinder
262 Second cylinder terminating end
270 Second click lock attachment
300 Battery compartment Referring now to FIG. 1-8, the present invention features a sanitary pet walking system (100) for providing a lit walking path while safely restraining a pet and further providing a sanitary means for managing pet feces. In some embodiments, the system (100) comprises a hollow base (110) having a base first end (112), a base second end (114), a base middle (116), a base top (118), and a base bottom (119). In some embodiments, the base first end (112) comprises a shape of a circular cylinder. In some embodiments, the base second end (114) comprises a shape of two circular cylinders side by side. In some embodiments, the base bottom (119) is located perpendicularly with respect to the base first end (112) and the base second end (114). In some embodiments, the base middle (116) smoothly connects the base first end (112) and the base second end (114).

In some embodiments, the base first end (112) flares to the base middle (116). In some embodiments, the base middle (116) flares to the base second end (114). In some embodiments, the base bottom (119) flares to the base middle (116).

In some embodiments, the system (100) comprises a light (120) located on a base first end terminating end (113) thereon. In some embodiments, the light (120) is positioned at a downward angle, for example 30 degrees, to shine light on a path while holding the base (110) parallel with a ground surface. In some embodiments, the light (120) is a single light. In some embodiments, the light is a plurality of lights, for example, light emitting diodes.

In some embodiments, the system (100) comprises a bag chamber (200) located in the base second end (114) therein in a first cylinder (210). In some embodiments, a bag chamber lid (202) is sealably located on a first cylinder terminating end (212) thereon. In some embodiments, a bag chamber pop up lid (204) is pivotally located over a bag chamber aperture and held into position via a first clock lock attachment (220).

In some embodiments, the system (100) comprises a wipe chamber (250) located in the base second end (114) therein in a second cylinder (260). In some embodiments, a wipe chamber lid (252) is sealably located on a second cylinder terminating end (262) thereon. In some embodiments, a wipe chamber pop up lid (254) is pivotally located over a wipe chamber aperture and held into position via a second click lock attachment (270).

In some embodiments, the system (100) comprises a base middle chamber (117) located in the base middle (116) therein. In some embodiments, a power supply (140) is located in the base middle chamber (117) in a battery compartment (300).

In some embodiments, the system (100) comprises a handle (150) linearly located on the base top (118) thereon having a handle first end (152) located close to the base first end (112) and a handle second end (154) located close to the base second end (114).

In some embodiments, the handle (150) comprises a power switch (141) located thereon operatively connected to the light (120) and the power supply (140). In some embodiments, the power switch (141) is located close to the handle first end (152).

In some embodiments, the system (100) comprises a retractable leash (160) located on the base bottom (119) therein close to the base middle (116) in a leash cavity (168). In some embodiments, the leash (160) is spring-biased having a retracting spring (166) located in the leash cavity (168) therein and attached to a leash second end (164) thereon. In some embodiments, a clip (163) is located on a leash first end (162) for attaching to a collar of a pet.

Figure 1:
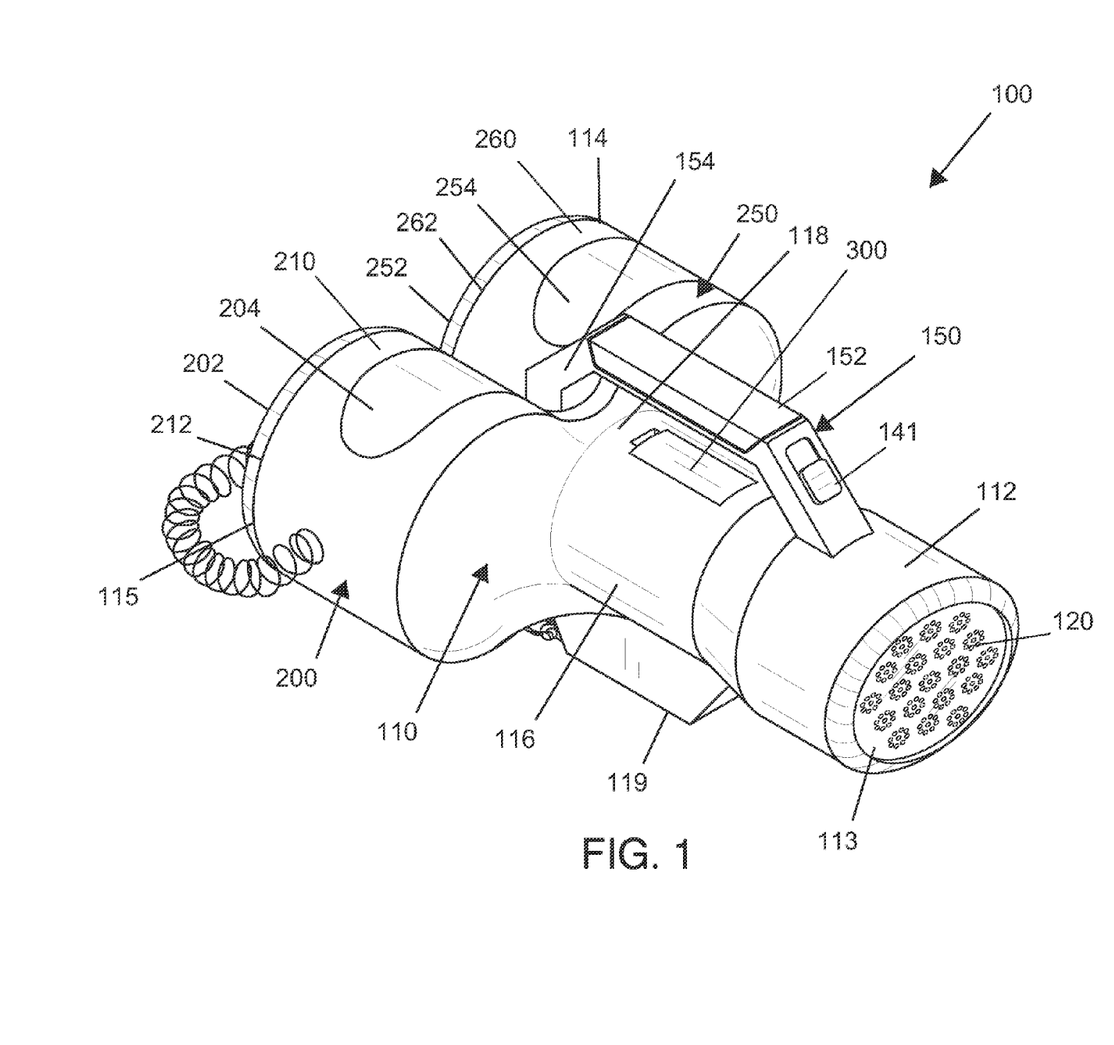
FIG. 1 shows a perspective view of the present invention featuring the base first end.
Figure 2:
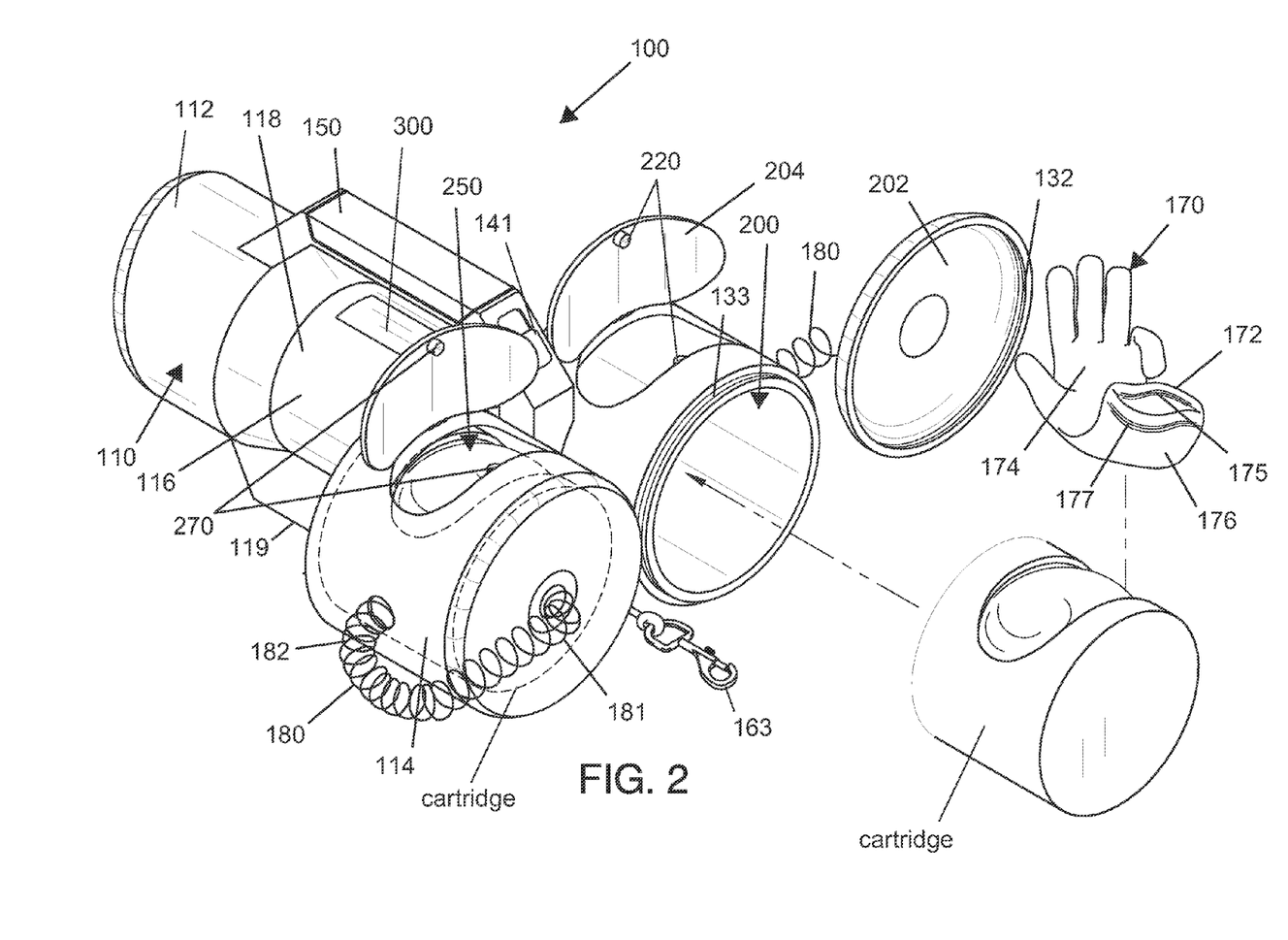
FIG. 2 shows a perspective view of the present invention featuring the base second end.
Figure 3:
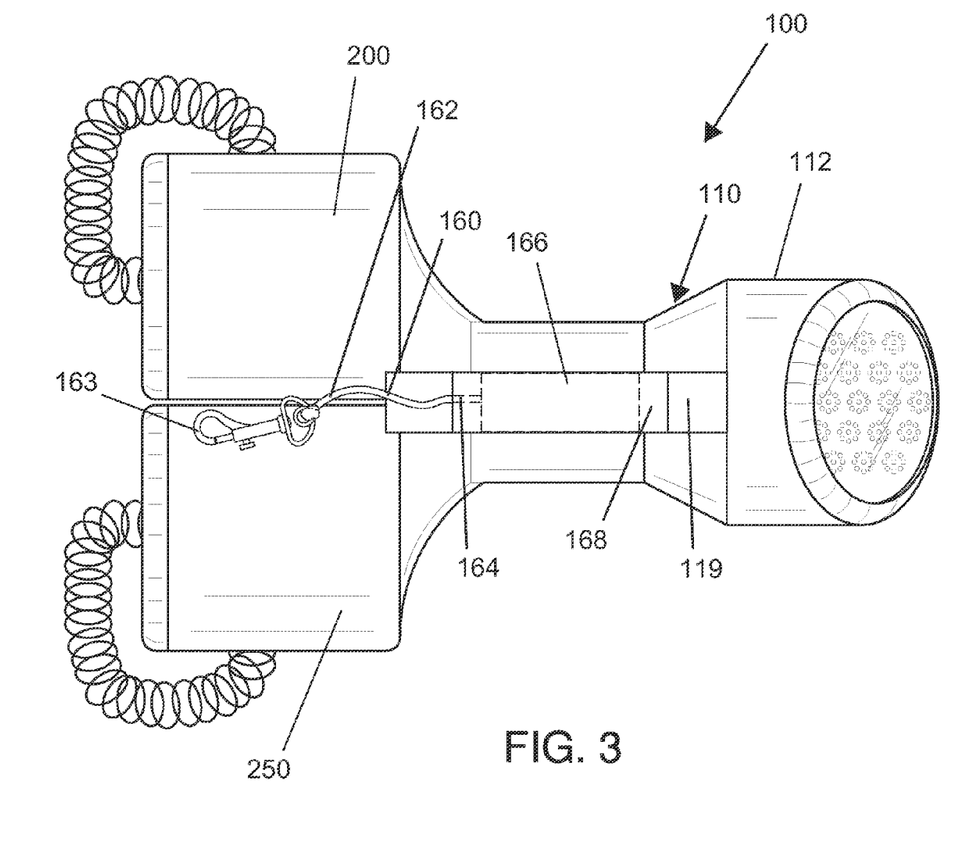
FIG. 3 shows a bottom view of the present invention.
Figure 4:
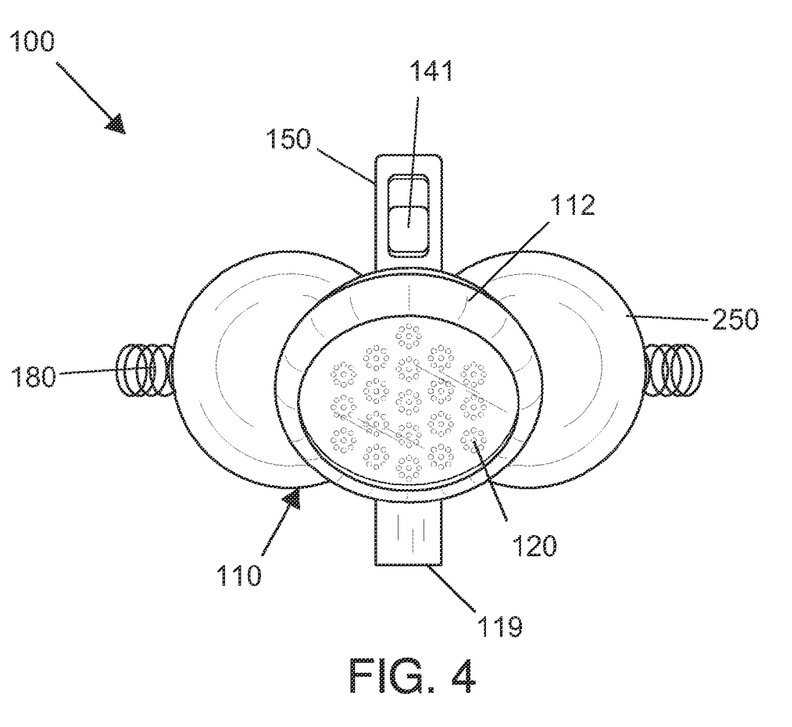
FIG. 4 shows a front view of the present invention.
Figure 5:
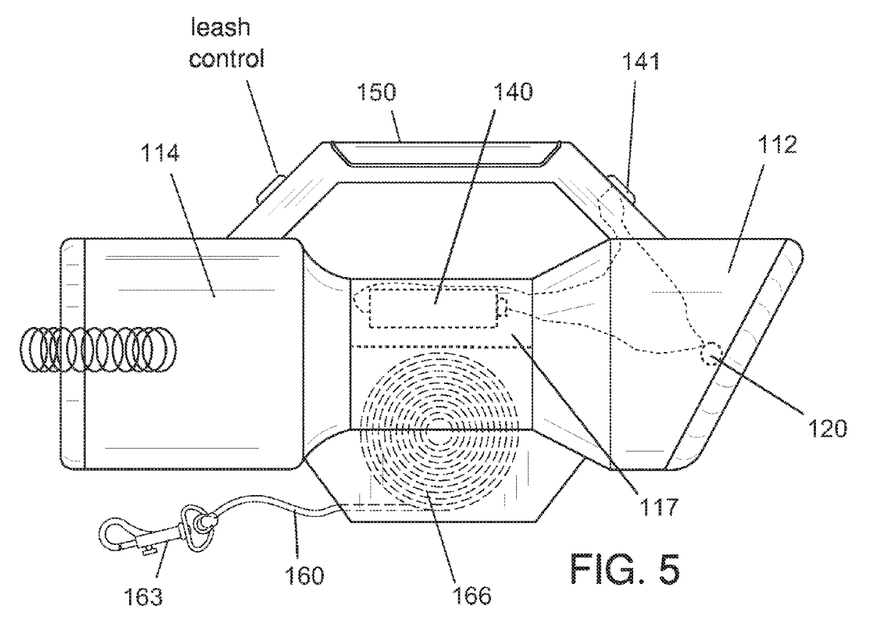
FIG. 5 shows a side view of the present invention.
Figure 6:
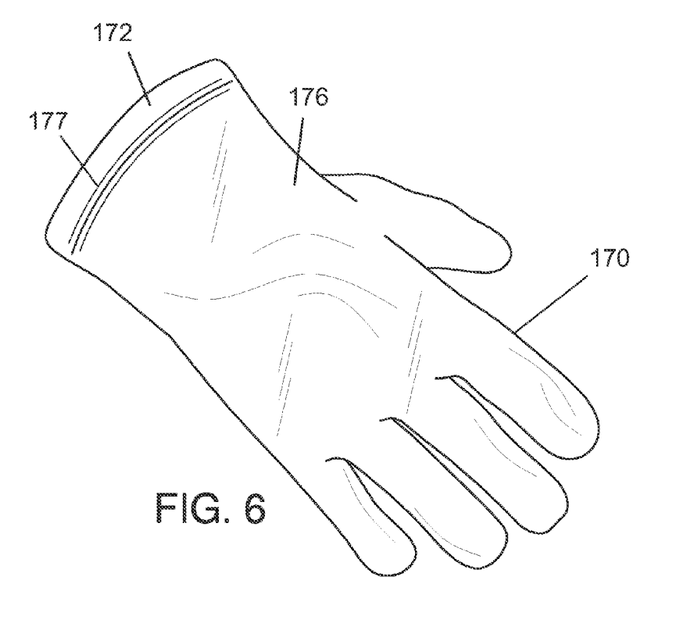
FIG. 6 shows a perspective view of the glove of the present invention.

In some embodiments, the system (100) comprises a disposable glove (170). In some embodiments, the glove (170) is designed to pick up pet feces. In some embodiments, the glove (170) is constructed from a water resistant or water proof material. In some embodiments, a glove terminating open end (172) extends past a wrist of a wearer. In some embodiments, the glove (170) comprises a first plastic zipper component (175) located on a glove face (174) close to the glove terminating end (172) and a mating second plastic zipper component (177) located opposed to the first plastic zipper component (175) on a glove back (176) close to the glove terminating end (172).

In some embodiments, the clip (163) is attached to a collar on the pet. In some embodiments, the leash (160) is retracted from the leash cavity (168) for restraining the pet for walking. In some embodiments, a user activates the light (120) for illuminating a path for walking the pet via the power switch (141).

In some embodiments, when the pet defecates, an unused disposable glove (170) is removed from the bag chamber (200) and placed on a hand of the user. In some embodiments, the user picks up the feces. In some embodiments, the user removes the glove (170) from the hand while turning the glove (170) inside out to encapsulate the feces. In some embodiments, the inside-out-glove (170) is sealed via the first plastic zipper component (175) matingly interfacing with the second plastic zipper component (177).

In some embodiments, a spring first end (181) is located on the bag chamber lid (202) or the wipe chamber lid (252) and a spring second end (182) is located on the base (110) for keeping bag chamber lid (202) or the wipe chamber lid (252) near the base (110) via an attached spring (180).

In some embodiments, one or more unused disposable gloves (170) are located in the bag chamber (200) before use. In some embodiments the bag chamber (200) comprises a bag chamber pop up lid (204) for easy access to the disposable gloves (170). In some embodiments, disposable gloves (170) are bags. In some embodiments, the bag chamber pop up lid (204) is pivotally attached to the bag chamber (200) and held in position by a first click lock attachment (220).

In some embodiments, one or more unused disposable gloves (170) are located in a glove cartridge. In some embodiments, the glove cartridge is located in the bag chamber (200).

In some embodiments, the system (100) comprises sanitary wipes for cleaning the hand of the user. In some embodiments, one or more unused sanitary wipes are located in the wipe chamber (250) before use. In some embodiments the wipe chamber (250) comprises a wipe chamber pop up lid (254) for easy access to the sanitary wipes. In some embodiments, the wipe chamber pop up lid (254) is pivotally attached to the wipe chamber (250) and held in position by a second click lock attachment (270).

In some embodiments, one or more unused sanitary wipes are located in a wipe cartridge, wherein the wipe cartridge is located in the wipe chamber (250).

Figure 7:
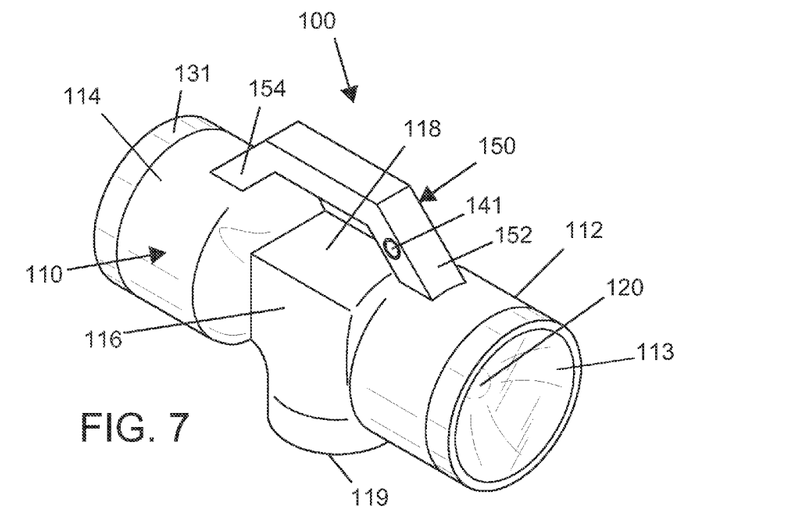
FIG. 7 shows a perspective view of an alternate embodiment of the present invention featuring the base first end.
Figure 8:
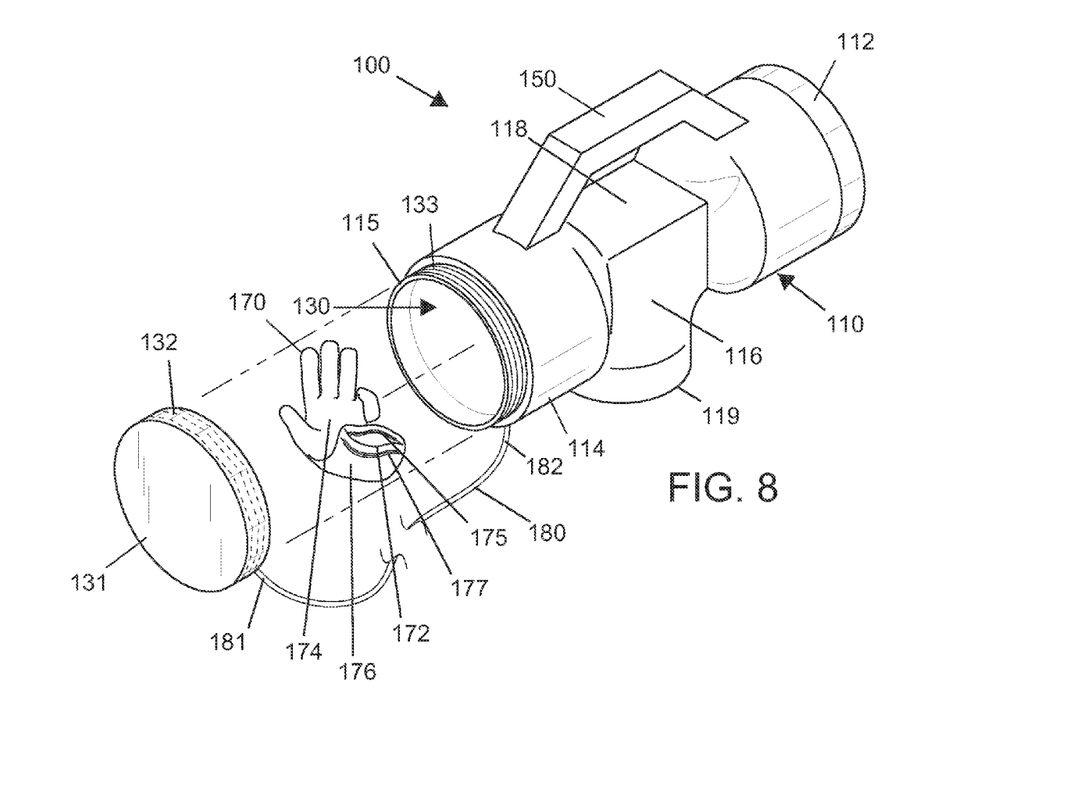
FIG. 8 shows a perspective view of an alternate embodiment of the present invention featuring the base second end.

In some embodiments, the present invention features a sanitary pet walking system (100) for providing a lit walking path while safely restraining a pet and further providing a sanitary means for managing pet feces. In some embodiments, the system (100) comprises a hollow base (110) having a base first end (112), a base second end (114), a base middle (116), a base top (118), and a base bottom (119).

In some embodiments, the base first end (112) and the opposing base second end (114) each comprise a shape of a circular cylinder. In some embodiments, the base bottom (119) comprises a shape of an elliptic cylinder and is located perpendicularly with respect to the base first end (112) and the base second end (114). In some embodiments, the base middle (116) comprises a shape of a rectangular prism.

In some embodiments, the round base first end (112) flares to the rectangular base middle (116). In some embodiments, the rectangular base middle (116) flares to the round base second end (114). In some embodiments, the elliptical base bottom (119) flares to the rectangular base middle (116).

In some embodiments, the base (110) comprises one or more storage compartments for feces, one or more gloves (170), one or more disposable liners, or one or more sanitary wipes.

In some embodiments, the system (100) comprises a light (120) located on a base first end terminating end (113).

In some embodiments, the system (100) comprises an isolated feces storage chamber (130) located in the base second end (114). In some embodiments, the bag chamber (200) or the wipe chamber (250) is the feces storage chamber (130). In some embodiments, a sealing lid (131) is located on a base second end terminating end (115). In some embodiments, the lid (131) snaps on. In some embodiments, the lid (131) screws on. In some embodiments, the lid (131) seals with a gasket. In some embodiments, the bag chamber lid (202) or the wipe chamber lid (252) is the sealing lid (131).

In some embodiments, the system (100) comprises a base middle chamber (117) located in the base middle (116). In some embodiments, a power supply (140) is located in the base middle chamber (117).

In some embodiments, the system (100) comprises a handle (150) linearly located on the base top (113) having a handle first end (152) located dose to the base first end (112) and a handle second end (154) located close to the base second end (114).

In some embodiments, handle (150) comprises a power switch (141) located thereon operatively connected to the light (120) and the power supply (140). In some embodiments, the power switch (141) is located close to the handle first end (152).

In some embodiments, the system (100) comprises a retractable leash (160) located on the base bottom (119) close to the base middle (116) in a leash cavity (168). In some embodiments, the leash (160) is spring-biased having a retracting spring (166) located in the leash cavity (168) and attached to a leash second end (164). In some embodiments, a clip (163) is located on a leash first end (162) for attaching to a collar of a pet. In some embodiments, the leash (160) pulls out from the leash cavity (168) and locks for use via a catch mechanism. In some embodiments, when the user is finished with the leash, the user releases the catch mechanism to allow the leash (160) to be retracted back into the leash cavity (168) via the retracting spring (166).

In some embodiments, the system (100) comprises a disposable glove (170). In some embodiments, the glove (170) designed to pick up pet feces. In some embodiments, the glove (170) is constructed from a water resistant or water proof material. In some embodiments, a glove terminating open end (172) extends past a wrist of a wearer. In some embodiments, the glove (170) is constructed from nitrile, latex, rubber, plastic or vinyl.

In some embodiments, the glove (170) comprises a first plastic zipper component (175) located on a glove face (174) close to the glove terminating end (172) and a mating second plastic zipper component (177) located opposed to the first plastic zipper component (175) on a glove back (176) close to the glove terminating end (172). In some embodiments, the glove (170) resembles an inside-out Ziploc™ storage back with finger members. In some embodiments, when the glove (170) is turned inside out, the first plastic zipper component (175) faces, mates with, and seals to the second plastic zipper component (177) to form a sealed chamber within for holding the feces.

In some embodiments, the clip (163) is attached to a collar on the pet. In some embodiments, the leash (160) is retracted from the leash cavity (168) for restraining the pet for walking. In some embodiments, a user activates the light (120) for illuminating a path for walking the pet and for locating pet feces via the power switch (141).

In some embodiments, when the pet defecates, an unused disposable glove (170) is removed from the feces storage chamber (130) and placed on a hand of the user. In some embodiments, the user picks up the feces. In some embodiments, the user removes the glove (170) from the hand while turning the glove (170) inside out to encapsulate the feces. In some embodiments, the inside-out-glove (170) is sealed via the first plastic zipper component (175) mating with and interfacing with the second plastic zipper component (177). In some embodiments, the sealed inside-out-glove (170) is stored in the feces storage chamber (130) until discarded in a trash receptacle.

In some embodiments, a spring first end (181) is located on the lid (131) and a spring second end (182) is located on the base (110) for keeping the lid (131) near the base (110) via an attached spring (180). In some embodiments, the spring (180) is constructed from plastic, metal (wire), nylon, or cotton.

In some embodiments, the lid (131) comprises internal threads (132) located inside. In some embodiments, the base second end (114) comprises external threads (133) located outside for mating with and attaching to the lid (131).

In some embodiments, one or more unused disposable gloves (170) are located in the feces storage chamber (130) before use.

In some embodiments, the feces storage container comprises a disposable liner located inside.

In some embodiments, the system (100) comprises sanitary wipes for cleaning the hand of the user. In some embodiments, the sanitary wipes are stored in the feces storage chamber (130) before use.

As used herein, the term "about" refers to plus or minus 10% of the referenced number.

The disclosures of the following U.S. Patents are incorporated in their entirety by reference herein: U.S. Pat. No. D 634,491; U.S. Patent Pub. No. 2008/0265592; U.S. Pat. No. 7,506,615; U.S. Pat. No. 7,410,197; U.S. Pat. No. 6,035,809; and U.S. Pat. No. 5,540,469.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A sanitary pet walking system (100) for providing a lit walking path while safely restraining a pet and further providing a sanitary means for managing pet feces, wherein the system (100) comprises:

(a) a hollow base (110) having a base first end (112), a base second end (114), a base middle (116), a base top (118), and a base bottom (119), wherein the base first end (112) comprises a shape of a circular cylinder, wherein the base second end (114) comprises a shape of two circular cylinders side by side, wherein the base bottom (119) is disposed perpendicularly with respect to the base first end (112) and the base second end (114), wherein the base middle (116) smoothly connects the base first end (112) and the base second end (114), wherein the base first end (112) flares to the base middle (116), wherein the base middle (116) flares to the base second end (114), wherein the base bottom (119) flares to the base middle (116);

(b) a light (120) disposed on a base first end terminating end (113) thereon;

(c) a bag chamber (200) disposed in the base second end (114) therein in a first cylinder (210), wherein a bag chamber lid (202) is sealably disposed on a first cylinder terminating end (212) thereon, wherein a bag chamber pop up lid (204) is pivotally disposed over a bag chamber aperture and held into position via a first click lock attachment (220);

(d) a wipe chamber (250) disposed in the base second end (114) therein in a second cylinder (260), wherein a wipe chamber lid (252) is sealably disposed on a second cylinder terminating end (262) thereon, wherein a wipe chamber pop up lid (254) is pivotally disposed over a wipe chamber aperture and held into position via a second click lock attachment (270);

(e) a base middle chamber (117) disposed in the base middle (116) therein, wherein a power supply (140) is disposed in the base middle chamber (117) in a battery compartment (300);

(f) a handle (150) linearly disposed on the base top (118) thereon having a handle first end (152) disposed proximal to the base first end (112) and a handle second end (154) disposed proximal to the base second end (114), wherein the handle (150) comprises a power switch (141) disposed thereon operatively connected to the light (120) and the power supply (140), wherein the power switch (141) is disposed proximal to the handle first end (152);

(g) a retractable leash (160) disposed on the base bottom (119) therein proximal to the base middle (116) in a leash cavity (166), wherein the leash (160) is spring-biased having a retracting spring (166) disposed in the leash cavity (168) therein and attached to a leash second end (164) thereon, wherein a clip (163) is disposed on a leash first end (162) for attaching to a collar of a pet; and (h) a disposable glove (170), wherein the glove (170) designed to pick up pet feces, wherein the glove (170) is constructed from a water resistant or water proof material, wherein a glove terminating open and (172) extends pasta wrist of a wearer, wherein the glove (170) comprises a first plastic zipper component (175) disposed on a glove face (174) proximal to the glove terminating end (172) and a mating second plastic zipper component (177) disposed opposed to the first plastic zipper component (175) on a glove back (176) proximal to the glove terminating end (172);

wherein the clip (163) is attached to a collar on the pet, wherein the leash (160) is retracted from the leash cavity (168) for restraining the pet for walking, wherein a user activates the light (120) for illuminating a path for walking the pet and for locating pet feces via the power switch (141), wherein when the pet defecates, an unused disposable glove (170) is removed from the bag chamber (200) and placed on a hand of the user, wherein the user picks up the feces, wherein the user removes the glove (170) from the hand while turning the glove (170) inside out to encapsulate the feces, wherein the inside-out-glove (170) is sealed via the first plastic zipper component (175) matingly interfacing with the second plastic zipper component (177).

2. The system (100) of claim 1, wherein a spring first end (181) is disposed on the bag chamber lid (202) or the wipe chamber lid (252) and a spring second end (182) is disposed on the base (110) for keeping bag chamber lid (202) or the wipe chamber lid (252) near the base (110) via an attached spring (180).

3. The system (100) of claim 1, wherein one or more unused disposable gloves (170) are disposed in the bag chamber (200) before use.

4. The system (100) of claim 1, wherein one or more unused disposable gloves (170) are disposed in a glove cartridge, wherein the glove cartridge is disposed in the bag chamber (200).

5. The system (100) of claim 1, wherein the system (100) comprises sanitary wipes for cleaning the hand of the user, wherein one or more unused sanitary wipes are disposed in the wipe chamber (250) before use.

6. The system of claim 1, wherein one or more unused sanitary wipes are disposed in a wipe cartridge, wherein the wipe cartridge is disposed in the wipe chamber (250).

* * * * *